United States Patent
Park et al.

(10) Patent No.: US 9,967,794 B2
(45) Date of Patent: May 8, 2018

(54) HANDOVER METHOD AND APPARATUS IN MOBILE COMMUNICATION SYSTEM

(71) Applicants: Samsung Electronics Co., Ltd., Gyeonggi-do (KR); Korea Advanced Institute of Science and Technology, Daejeon (KR)

(72) Inventors: Sung-Jin Park, Gyeonggi-do (KR); Min-Hoe Kim, Daejeon (KR); Byung-Chang Chung, Seoul (KR); Dong-Ho Cho, Seoul (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 264 days.

(21) Appl. No.: 14/912,896

(22) PCT Filed: Aug. 8, 2014

(86) PCT No.: PCT/KR2014/007368
§ 371 (c)(1),
(2) Date: Feb. 18, 2016

(87) PCT Pub. No.: WO2015/026084
PCT Pub. Date: Feb. 26, 2015

(65) Prior Publication Data
US 2016/0205606 A1     Jul. 14, 2016

(30) Foreign Application Priority Data

Aug. 20, 2013 (KR) ........................ 10-2013-0098429

(51) Int. Cl.
*H04W 36/30*     (2009.01)
*H04W 24/10*     (2009.01)
(Continued)

(52) U.S. Cl.
CPC .......... *H04W 36/30* (2013.01); *H04W 24/10* (2013.01); *H04W 36/08* (2013.01); *H04W 48/20* (2013.01);
(Continued)

(58) Field of Classification Search
CPC ..... H04W 36/08; H04W 52/02; H04W 36/18; H04W 52/0209; H04W 52/0235
See application file for complete search history.

(56) References Cited

U.S. PATENT DOCUMENTS

| | | |
|---|---|---|
| 2005/0059437 A1 | 3/2005 | Son |
| 2007/0230400 A1 | 10/2007 | Kuchibhotla et al. |

(Continued)

FOREIGN PATENT DOCUMENTS

| | | |
|---|---|---|
| KR | 10-2005-0024125 A | 3/2005 |
| KR | 10-2009-0017378 A | 2/2009 |
| KR | 10-2012-0112271 A | 10/2012 |

OTHER PUBLICATIONS

International Search Report dated Nov. 13, 2014 in connection with International Application No. PCT/KR2014/007368; 3 pages.

(Continued)

*Primary Examiner* — Omoniyi Obayanju

(57) ABSTRACT

Provided are two types of schemes capable of reducing power consumption of a User Equipment (UE). The first scheme is to select a set capable of minimizing power consumption of the UE when the UE enters a sleep mode. The second scheme is a handover scheme in which the UE having entered the sleep mode maintains the sleep mode corresponding to a cooperative Base Station (BS) set in a handover of the UE.

20 Claims, 11 Drawing Sheets

(51) Int. Cl.
 H04W 36/08 (2009.01)
 H04W 52/02 (2009.01)
 H04W 48/20 (2009.01)
 H04W 76/04 (2009.01)
(52) U.S. Cl.
 CPC ..... *H04W 52/0216* (2013.01); *H04W 76/048* (2013.01); *Y02B 60/50* (2013.01)

(56) References Cited

U.S. PATENT DOCUMENTS

| | | |
|---|---|---|
| 2007/0291729 A1 | 12/2007 | Dalsgaard et al. |
| 2008/0090573 A1 | 4/2008 | Kim et al. |
| 2009/0092056 A1* | 4/2009 | Kitazoe ............. H04W 36/0088 370/252 |
| 2011/0075604 A1* | 3/2011 | Fong .................... H04L 63/162 370/328 |
| 2011/0195714 A1* | 8/2011 | Sawinathan ........ H04W 60/005 455/435.1 |
| 2012/0250538 A1 | 10/2012 | Su et al. |

OTHER PUBLICATIONS

Written Opinion of the International Searching Authority dated Nov. 13, 2014 in connection with International Application No. PCT/KR2014/007368; 5 pages.

\* cited by examiner

HANDOVER METHOD AND APPARATUS IN MOBILE COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2014/007368 filed Aug. 8, 2014, entitled "HANDOVER METHOD AND APPARATUS IN MOBILE COMMUNICATION SYSTEM", and, through International Patent Application No. PCT/KR2014/007368, to Korean Patent Application No. 10-2013-0098429 filed Aug. 20, 2013, each of which are incorporated herein by reference into the present disclosure as if fully set forth herein.

TECHNICAL FIELD

The present disclosure relates to a handover method and apparatus in a mobile communication system and to a handover method and apparatus in a mobile communication system, in which power consumption of a User Equipment (UE) may be reduced when the UE performs a handover.

BACKGROUND ART

A $3^{rd}$-Generation (3G) communication system generally supports a data rate of about 384 Kbps in an outdoor channel environment with a relatively poor channel environment, and supports a data rate of up to 2 Mbps even in an indoor channel environment with a relatively good channel environment.

Accordingly, research is being actively conducted on a new communication system that guarantees relatively high data rate and at the same time, mobility and Quality of Service (QoS) in a $4^{th}$-Generation (4G) or $5^{th}$-Generation (5G) communication system. As an approach to achieving these purposes, a sleep mode operation scheme for reducing power consumption of a UE and a handover operation scheme corresponding to high-speed movement for guaranteeing wireless mobility of the UE and QoS are taken into consideration.

DISCLOSURE OF INVENTION

Technical Problem

In a conventional handover operation scheme, to guarantee wireless mobility of the UE and QoS, the UE maintains an awake state depending on a channel state in spite of receiving a sleep mode request to improve a handover success rate, thereby guaranteeing wireless mobility of the UE and QoS. More specifically, an awake period may be adaptively applied considering a channel state accumulated depending on a change in the channel state, a real-time channel state, or the like. For example, if the UE expected to perform a handover is in the sleep mode or attempts to enter the sleep mode, then switch to the awake state is determined based on channel state information received from a serving Base Station (BS), thereby improving a handover success rate.

However, such a conventional handover operation scheme focuses on the handover success rate without considering power consumption of the UE.

The above information is presented as background information only to assist with an understanding of the present disclosure. No determination has been made, and no assertion is made, as to whether any of the above might be applicable as prior art with regard to the present disclosure.

Solution to Problem

Aspects of the present disclosure have been made to at least partially solve, alleviate, or remove at least one of problems and/or disadvantages described above.

Accordingly, various aspects of the present disclosure provide a handover method and apparatus in a mobile communication system to reduce power consumption of a UE.

Other objects to be provided in the present disclosure may be understood by embodiments described below.

According to an aspect of the present disclosure, there is provided a method for performing a handover in a User Equipment (UE) of a mobile communication system with a serving cluster comprising multiple Base Stations (BSs) and a neighboring cluster that is adjacent to the serving cluster, the method comprising determining whether to enter a sleep mode based on an Uplink (UL) transmission power of the UE, sending a measurement report message to a pivot BS belonging to both the serving cluster and the neighboring cluster, if entering the sleep mode, and receiving a handover command message from the pivot BS during a listening window of the sleep mode, based on the measurement report message.

According to another aspect of the present disclosure, there is provided a method for performing a handover in a Base Station (BS) of a mobile communication system with a serving cluster comprising multiple Base Stations (BSs) and a neighboring cluster that is adjacent to the serving cluster, the method comprising receiving a measurement report message comprising sleep mode identification information from a User Equipment (UE) that communicates with a serving BS among the multiple BSs of the serving cluster and has entered a sleep mode, sending a handover request message for the received measurement report message to a target BS in the neighboring cluster, receiving a handover response message with respect to the handover request message from the target BS and determining based on the sleep mode identification information of the UE whether the sleep mode is based on communication with the serving cluster; and setting a transmission time of a handover command message with respect to the handover response message to allow the handover command message to be received during a listening window of the sleep mode set by the UE if the sleep mode is based on communication with the serving cluster.

According to another aspect of the present disclosure, there is provided a User Equation (UE) that performs a handover in a mobile communication system with a serving cluster comprising multiple Base Stations (BSs) and a neighboring cluster that is adjacent to the serving cluster, the UE comprising a communicator configured to switch to a sleep mode, and a controller configured to switch the communicator to a sleep mode based on an Uplink (UL) transmission power of the UE, and to control the communicator to send a measurement report message to a pivot BS belonging to both the serving cluster and the neighboring cluster and to receive a handover command message from the pivot BS during a listening window of the sleep mode based on the measurement report message, if the communicator enters the sleep mode.

According to another aspect of the present disclosure, there is provided a Base Station (BS) that performs a handover in a mobile communication system with a serving cluster comprising multiple Base Stations (BSs) and a neighboring cluster that is adjacent to the serving cluster, the BS comprising a communicator configured to receive a measurement report message comprising sleep mode identification information from a User Equipment (UE) that communicates with a serving BS among the multiple BSs of the serving cluster and has entered a sleep mode, and a controller configured to send a handover request message for the received measurement report message to a target BS in the neighboring cluster and to receive a handover response message with respect to the handover request message from the target BS and determine based on the sleep mode identification information of the UE whether the sleep mode is based on communication with the serving cluster, and to set a transmission time of a handover command message with respect to the handover response message to allow the handover command message to be received during a listening window of the sleep mode set by the UE if the sleep mode is based on communication with the serving cluster.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features and advantages of embodiments of the present disclosure will be more apparent from the following description taken in conjunction with the accompanying drawings, in which.

Throughout the drawings, like reference numerals will be understood to refer to like parts, components, and structures.

MODE FOR THE INVENTION

Figure 1:
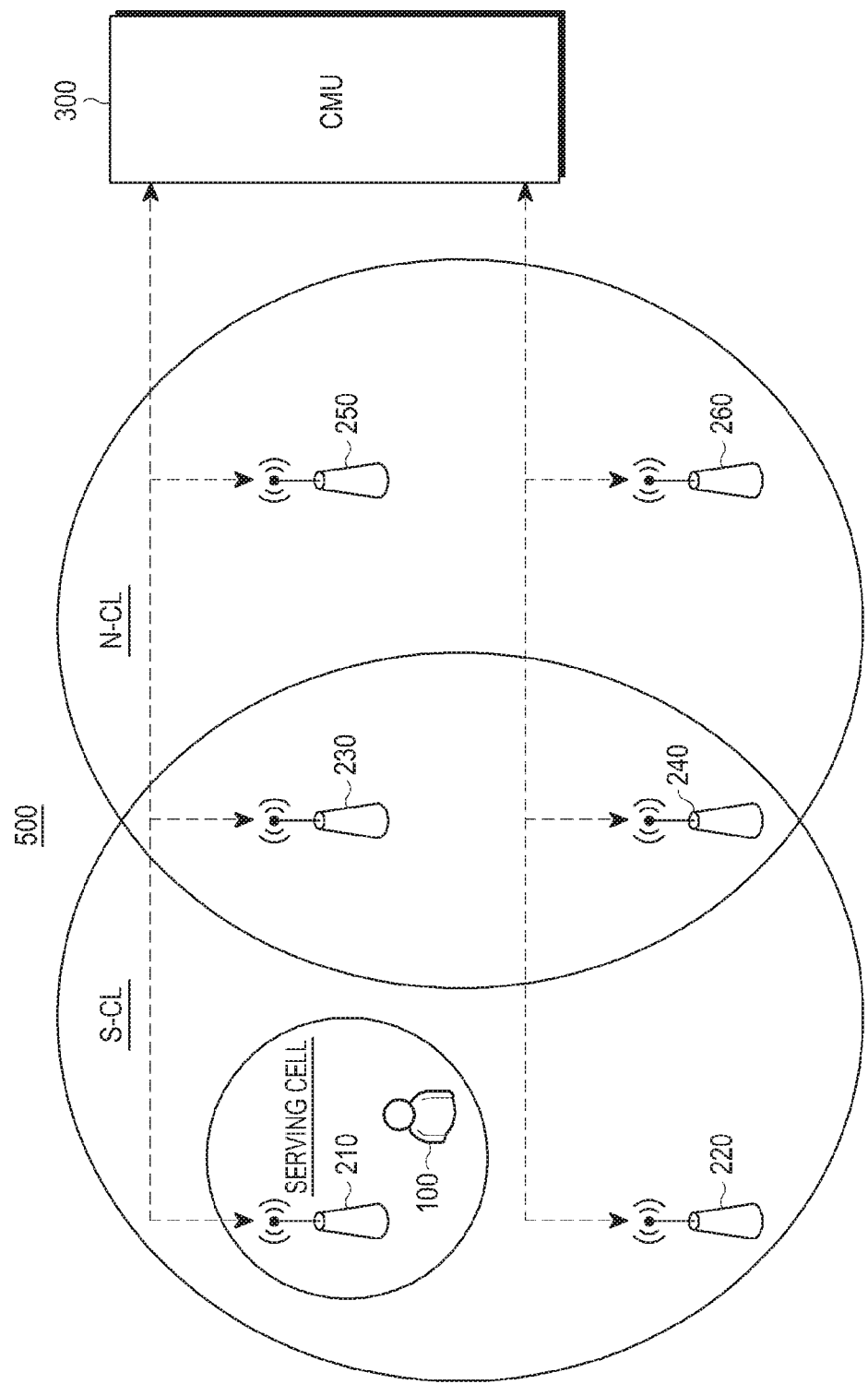
FIG. 1 is a diagram illustrating a configuration of a mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure proposes two methods for reducing power consumption of a User Equipment (UE). The first one is to select a set for minimizing power consumption of a UE when the UE enters a sleep mode. The second one is a method when the UE having entered the sleep mode performs a handover by maintaining the sleep mode corresponding to a cooperative Base Station (BS) set.

More specifically, the UE attempting to enter the sleep mode derives Uplink (UL)/Downlink (DL) throughput and UL transmission power (or UL power) of the UE, such that selection between a sleep mode set based on a serving cluster and a sleep mode based on a serving BS is provided.

The present disclosure also provides a method by which the UE may maintain the sleep mode state when performing a handover in the serving-cluster-based sleep mode. More specifically, the present disclosure provides a method by which the UE may maintain the sleep mode even after sending a handover request message to a BS.

First, technical terms used throughout the specification will be explained.

Mobile Communication System

A mobile communication system to which a method for reducing power consumption of a UE, proposed by the present disclosure, is applied may include one or more wireless access network controllers to control one or more BSs using Radio Frequency (RF) signals.

The mobile communication system according to the present disclosure may form a network environment in which a virtual cluster is formed by grouping multiple BSs, each of which is a basic unit.

Various multiple access schemes used in the mobile communication system according to the present disclosure may include, for example, Long-Term Evolution (LTE), Evolved High-Speed Packet Access (HSPA+), Code Division Multiple Access (CDMA) techniques (for example, CDMA 2000 1x, High Rate Packet Data (HRPD)), Wideband CDMA (WCDMA) techniques, Time Division Multiple Access (TDMA), Frequency Division Multiple Access (FDMA), Single-Carrier FDMA (SC-FDMA), Orthogonal Frequency Division Multiple Access (OFDMA), and Worldwide Interoperability for Microwave Access (WiMAX).

Base Station (BS)

The BS according to the present disclosure outputs RF signals carrying signaling and data to UEs through a UL or a DL in a limited geographic coverage area known as a wireless cell (or a cell).

The DL means communication from the BS to the UE, and the UL means communication from the UE to the BS. In the DL, a transmitter may be a part of the BS and a receiver may be a part of the UE. In the UL, the transmitter may be a part of the UE and the receiver may be a part of the BS.

The signaling may include various control and network management signals, and the data may include any or all of voice data, text data, graphic data, application data, audio data, and video data.

The BS may be referred to as a distributed small BS, an Access Point (AP), or an Access Network (AN), or may be included as a part of the AN. In some communication standards, the BS may be a Node-B, an eNode B, a Base Transceiver System (BTS), a remote head unit, an AP, a home BS, a femto-cell BS, a relay station, an scatterer, a repeater, an intermediate node, a relay device, and/or a satellite-based communication BS.

User Equipment (UE)

The UE transmits a signal to a BS on a DL or a UL. The UE may be, for example, a Mobile Station (MS), a Subscriber Station (SS), an advanced mobile station, an Access Terminal (AT), a wireless terminal communication device, an M2M device, an MTC device server, a client, a desktop computer, a laptop, a network computer, a workstation, a Personal Digital Assistant (PDA), a tablet Personal Computer (PC), a scanner, a phone, a camera, a Television (TV), a portable video game console, a music device, a media player, a wireless sensor, an electronic reader, or the like. In some applications, the UE may be a stationary computing device that operates in a mobile environment, such as a bus, a train, an airplane, a boat, a vehicle, or the like.

FIG. 1 is a diagram illustrating a configuration of a mobile communication system according to an embodiment of the present disclosure.

Referring to FIG. 1, a mobile communication system 500 according to an embodiment of the present disclosure may include a UE 100, multiple BSs 210, 220, . . . , 260, and a Central Management Unit (CMU) 300.

The UE 100 according to an embodiment of the present disclosure operates with battery power (hereinafter, simply referred to as power), and basically supports Discontinuous Transmission (DTX) and Discontinuous Reception (DRX) operations having a sleep cycle for improving power efficiency. The DTX operation and the DRX operation may be implemented by setting transmission and reception patterns and triggers, and in some periods, the UE turns on its RF transceiver to maintain an awake mode and in other periods, the UE turns off the RF transceiver to maintain a sleep mode.

The UE 100 according to an embodiment of the present disclosure supports two types of sleep modes including a serving-BS-based sleep mode and a serving-cluster-based sleep mode to improve power efficiency, and may be implemented to select one of the two sleep modes. In the present disclosure, to allow consideration of sleep mode selection to reduce power consumption of the UE, an average UL transmission power and an average UL and/or DL throughput of the UE are considered, as will be described below in more detail.

When the UE 100 according to an embodiment of the present disclosure performs a handover in the serving-BS-based sleep mode, the UE 100 transmits a handover request message HO_REQ to the BS and switches to the awake mode to receive a handover command message HO_cmd from the BS, and receives the handover command message HO_cmd during a listening window having a first time period (length or duration) agreed with the BS in the awake mode.

When the UE 100 according to an embodiment of the present disclosure performs a handover in the serving-cluster-based sleep mode, the UE 100 maintains the serving-cluster-based sleep mode, without switching to the awake mode, to receive the handover command message HO_cmd, and receives the handover command message HO_cmd during a listening window having a second time period agreed with the BS. Herein, the second time period is implemented shorter than the first time period, such that in the serving-cluster-based sleep mode, the UE 100 maintains an ON state during the second time period that is shorter than the first time period to receive the handover command message HO_cmd, thus improving power consumption.

Under control and management of the CMU 300, the multiple BSs 210, 220, . . . , 260 according to an embodiment of the present disclosure are grouped into BSs 210, 220, 230, and 240 forming a Serving Cluster (S-CL), BSs 230, 240, 250, and 260 forming a Neighboring Cluster (N-CL), and BSs 230 and 240 belonging to both the S-CL and the N-CL, and in the following description, the BSs 230 and 240 are referred to as pivot BSs, and the S-CL is assumed to include a serving cell formed by the serving BS 210 under control and management of the CMU 300. The present applicant will refer a scheme for grouping the BSs 210, 220, . . . , 260 as a Virtual Cluster Network (VCN) environment. Although not specified, the present disclosure may be regarded as including a process in which when a handover process is performed in a VCN environment, the UE 100 releases connection with a serving BS while maintaining connection with the pivot BSs 230 and 240, and adds connection with a target BS.

The CMU 300 according to an embodiment of the present disclosure controls and manages the multiple BSs 210, 220, . . . , 260 to group them into a S-CL, a N-CL, and pivot BSs, as mentioned above. In an embodiment of the present disclosure, the UE 100 determines whether to enter the serving-cell-based sleep mode or the S-CL-based sleep mode, but in another embodiment of the present disclosure, the CMU 300 determines a sleep mode the UE 100 is to enter and recommends the determined sleep mode to the UE 100, as will be described below in detail.

Hereinafter, a process in which the UE 100 enters a sleep mode will be described in detail.

Figure 2A:
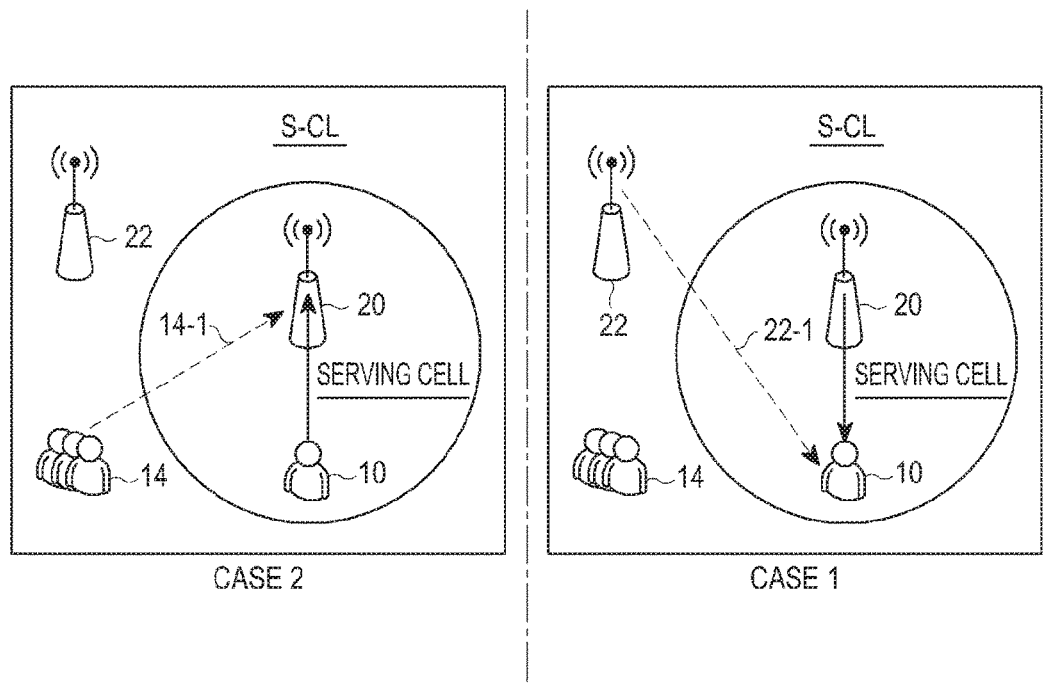
FIGS. 2a and 2b are diagrams for describing a sleep mode based on a serving Base Station (BS) of a UE and a sleep mode based on a serving cluster.
Figure 2B:
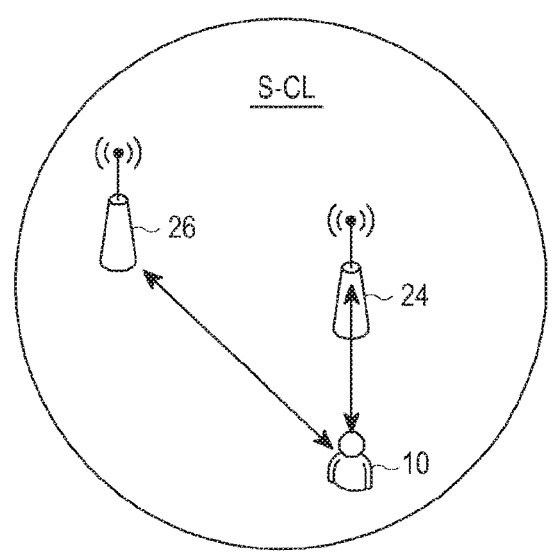

FIGS. 2a and 2b are diagrams for describing a serving-BS-based sleep mode and a S-CL-based sleep mode of a UE, in which FIG. 2a is a diagram for describing a communication environment of the UE in the serving-BS-based sleep mode, and FIG. 2b is a diagram for describing a communication environment of the UE in the S-CL-based sleep mode.

A mobile communication system according to an embodiment of the present disclosure provides both a communication environment in which a service is provided from a single serving BS in a serving cell as illustrated in FIG. 2a or a communication environment in which a service is provided from multiple BSs in a serving cluster as illustrated in FIG. 2b.

Thus, a case where a UE enters the sleep mode from a normal mode may be divided into a case where the UE enters the sleep mode in a communication environment where the UE is provided with a service from the serving BS and a case where the UE enters the sleep mode in a communication environment where the UE is provided with a service from multiple BSs in the serving cluster.

An embodiment of the present disclosure provides a choice between two sleep mode entry methods for minimizing power consumption of the UE.

As illustrated in FIG. 2a, if a UE 10 enters a sleep mode based on a serving BS 20 and performs UL and/or DL transmission during a listening window, the UE 10 is interfered by DL transmission 22-1 of another BS 22 out of the serving cell, instead of the serving BS 20 in the serving cell, in an S-CL (Case 1), or the serving BS 20 is interfered by UL transmission 14-1 of other UEs 14 (Case 2).

On the other hand, as illustrated in FIG. 2b, if the UE 10 enters the sleep mode based on (or in the unit of) a serving cluster, Case 1 or Case 2 of FIG. 2A does not occur.

However, if the UE 10 performs UL transmission based on the serving cluster, the UE 10 has to perform UL transmission in the unit of the single serving BS 20 in the serving cell, such that the UE 10 consumes only UL transmission power for the single serving BS 20, but in FIG. 2B, the UE 10 has to perform UL transmission in the unit of the S-CL, such that the UE 10 consumes UL transmission power for a BS 24 in the S-CL and UL transmission power for a BS 26 in the S-CL.

Thus, the UE 10 consumes more UL transmission power when entering the sleep mode based on the S-CL than UL transmission power consumed when the UE 10 enters the sleep mode based on the serving cell.

Considering reduction of UL transmission power, the UE may preferably enter the sleep mode in the communication environment where the UE is provided with the service from the serving BS in the serving cell, but considering interference, the UE may preferably enter the sleep mode in the communication environment where the UE is provided with the service from the S-CL.

In the present disclosure, a sleep mode of the UE is selected to minimize interference and power consumption, and as a selection criterion, at least one of an average UL transmission power of the UE and an average throughput of the UE may be considered. The average UL transmission power and the average throughput of the UE may be measured in the normal mode.

The average UL transmission power of the UE is an average value of the UL transmission power of the UE measured for a time window M. A reason to measure the average UL transmission power is to predict a long-term change by averaging a value obtained during a short-term period. The average UL transmission power of the UE includes an average UL transmission power when the UE performs an UL transmission with respect to a serving BS and an average UL power when the UE performs an UL transmission with respect to the S-CL.

If an UL is not formed between a neighboring BS of the serving BS and the UE in the S-CL, the UE estimates a channel gain obtained through an UL reference signal, instead of the average UL transmission power.

The average UP/DL throughput is estimated by averaging a measure of a throughput obtained in UL/DL transmission between the UE and the BS for the time window M. Herein, the DL throughput is estimated by the UE and the UL throughput is estimated by the BS. The average UL/DL throughput includes an average UL/DL throughput when the UE performs an UL/DL transmission with the serving BS and an average UL/DL throughput when the UE performs an UL/DL transmission with the S-CL.

When entering a sleep mode, the terminal selects a sleep mode based on the estimated values, which minimizes UL transmission power based on a transmission power-to-throughput value (transmission power/throughput) while improving an UL/DL throughput.

Hereinafter, a description will be made of a transmission efficiency corresponding to a relationship between an UL transmission power of the UE and a throughput of the UE.

Figure 3:
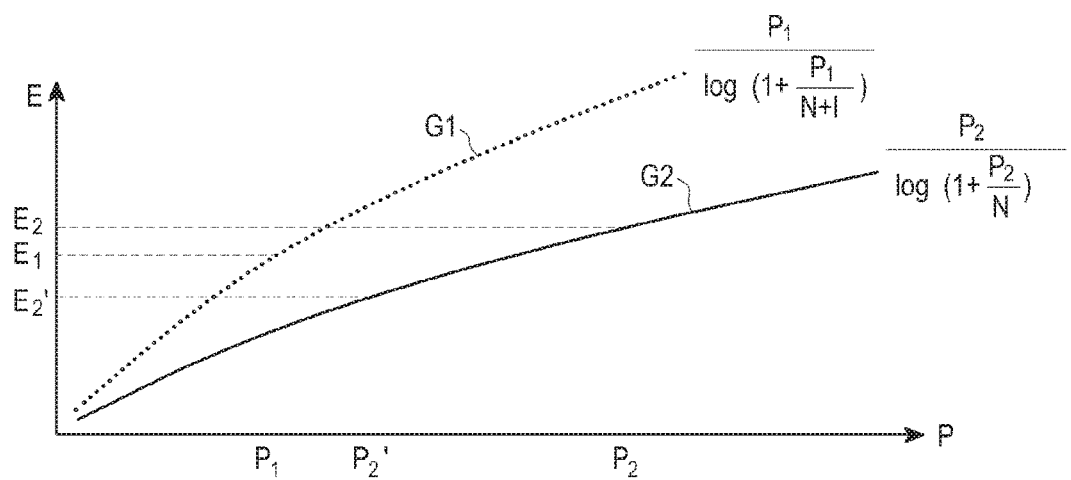
FIG. 3 is a diagram illustrating a relationship between an Uplink (UL) transmission power of a UE and a throughput of the UE.

FIG. 3 is a diagram illustrating a relationship between an UL transmission power of the UE and a throughput of the UE.

Referring to FIG. 3, a horizontal axis indicates a transmission power and a vertical axis indicates a transmission efficiency.

G1 indicates a curve showing a relationship between an UL transmission power and a throughput of the UE in the serving-BS-based sleep mode, and G2 indicates a curve showing a relationship between an UL transmission power and a throughput of the UE in the S-CL-based sleep mode.

G1 may be expressed as follows:

MathFigure 1

$$E_1 = \frac{P_1}{\text{throughput}}, \text{throughput} = \log_2\left(1 + \frac{p_1}{N+I}\right) \qquad [\text{Math. 1}]$$

where $E_1$ indicates a transmission efficiency in the serving-BS-based sleep mode, $P_1$ indicates an UL transmission power in the serving-BS-based sleep mode, N indicates a strength of a thermal noise, and I indicates a strength of an interference signal in the serving-BS-based sleep mode.

G2 may be expressed as follows:

MathFigure 2

$$E_2 = \frac{P_2}{\text{throughput}}, \text{throughput} = \log_2\left(1 + \frac{p_2}{N}\right) \qquad [\text{Math. 2}]$$

where E2 indicates a transmission efficiency in the S-CL-based sleep mode, and P2 indicates an UL transmission power of the UE in the S-CL-based sleep mode.

As can be seen from Equation 1 and Equation 2, transmission efficiencies $E_1$ and $E_2$ may be expressed an UL-transmission power-to-throughput. That is, how much resources are used per unit bit may be known from $E_1$ and $E_2$. Herein, as can be seen in Equation 1, in the serving-BS-based sleep mode, an I term is added. This means interference (22-1 of FIG. 2A) of the UE (10 of FIG. 2A) from a neighboring BS (22 of FIG. 2A) in a DL environment (Case 1 of FIG. 2A) and interference of the UE from another UE (14-1 of FIG. 2A) in an UL environment (Case 2 of FIG. 2A).

$P_1$
or
$P_2$
indicates the amount of power used for the UE to perform UL data transmission.

$$\log_2\left(1 + \frac{p_1}{N+I}\right)$$

indicates a throughput (channel capacity) obtained by the UE from the serving BS, and $$\log_2\left(1 + \frac{p_2}{N}\right)$$

indicates a throughput (channel capacity) obtained by the UE from the S-CL.

As described previously, in FIG. 3, $P_2$ used in the S-CL-based sleep mode is set larger than $P_1$ used in the serving-BS-based sleep mode, and in the serving-BS-based sleep mode, the UE may interfere with or may be interfered by a UE in a cell formed by a neighboring BS, such that a order relationship between $E_1$ and $E_2$ may change.

Therefore, a proper sleep mode for the UE needs to be provided considering such a trade-off.

Hereinafter, a detailed description will be made of a process in which after entering the S-CL-based sleep mode, the UE performs a handover while maintaining the sleep mode.

Figure 4:
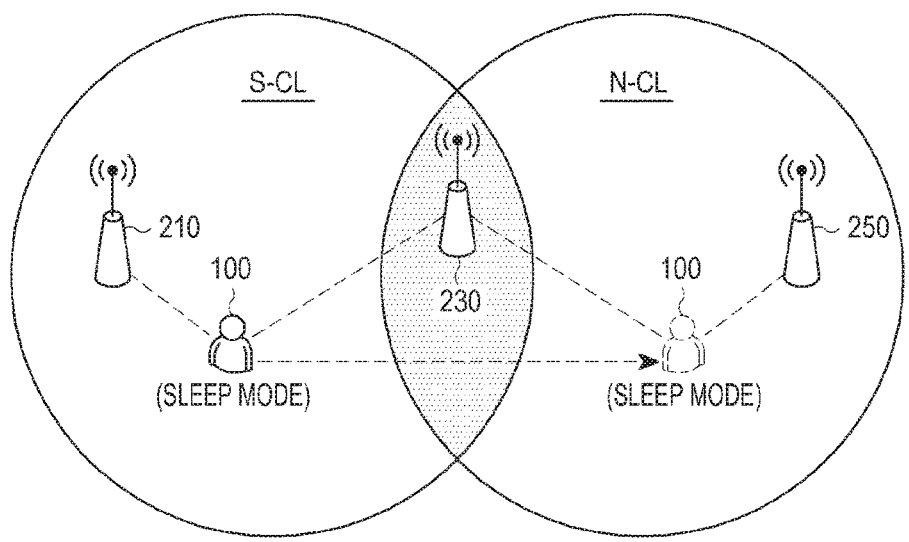
FIG. 4 is a diagram illustrating a handover process in a mobile communication system illustrated in FIG. 1.

FIG. 4 is a diagram illustrating a handover process in the mobile communication system illustrated in FIG. 1. The BSs 220, 240, and 260 and the CMU 300, which are illustrated in FIG. 1, are not illustrated in FIG. 4.

Referring to FIG. 4, a handover according to an embodiment of the present disclosure may include a process in which a UE 100 releases connection with a serving BS 210 and adds connection with a target BS 250, while maintaining connection with a pivot BS 230, which belongs to an S-CL and an N-CL at the same time, unlike a conventional process in which the UE 100 simply moves from the serving BS 210 to the target BS 250. While a pivot BS belonging to two clusters at the same time is illustrated in FIG. 4, the pivot BS may belong to three or more clusters at the same time.

As illustrated in FIG. 4, if the pivot BS 230 exists, the UE 100 does not release connection with the pivot BS 230, such that signaling between the UE 100 and the BS during the handover may be performed in the sleep mode, instead of the awake mode. To help understanding of the present disclosure, signaling related to a handover in the awake mode of the UE will be briefly described.

Figure 5:
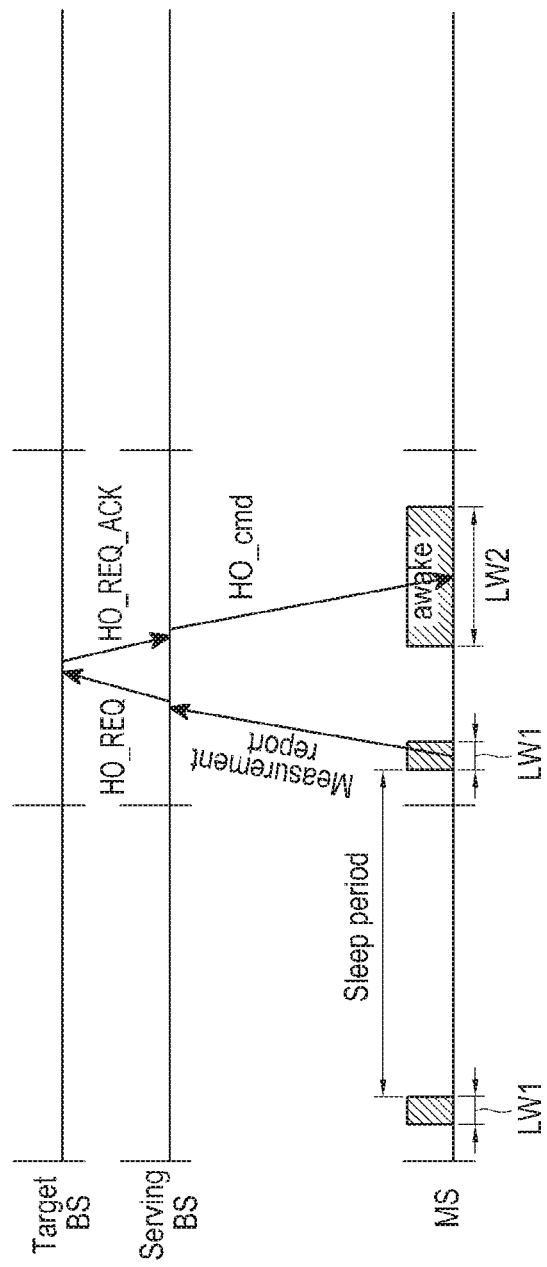
FIG. 5 is a diagram illustrating signaling in a conventional handover process.

FIG. 5 is a diagram illustrating signaling in a conventional handover process.

Referring to FIG. 5, a MS measures a channel state of a neighboring cell if a channel state of a serving BS is lowered to a predetermined threshold value or less (Measurement). The measurement of the channel state of the neighboring cell may be performed during a sleep period and is not performed in an awake period LW2.

The MS having measured the channel state of the neighboring cell sends a measurement report message Measurement report including a measurement result to a serving BS during a listening window LW1.

The serving BS having received the measurement report message Measurement report compares its channel environment with a channel environment of the neighboring cell based on the measurement report message Measurement report to determine a handover of the MS.

If determining that the MS needs to perform a handover, the serving BS sends a handover request message HO_REQ to the target BS and at the same time, the MS switches to the awake mode from the sleep mode. This is intended to reduce a reception failure of a handover command message HO_cmd during movement from the serving BS to the target BS in the handover.

If determining to accept the MS, the target BS sends a handover response message HO_REQ_ACK to the serving BS.

The serving BS having received the handover response message HO_REQ_ACK sends to the MS a handover command message HO_cmd indicating start of a handover procedure, together with information necessary for the handover.

A process from transmission of the handover request message HO_REQ to reception of the handover command message HO_cmd is referred to as a handover preparation stage. The handover command message HO_cmd may be received during a listening window LW2 of the awake mode. In the handover preparation stage, the MS may not know about whether to perform a handover, which is determined by the serving BS and the target BS. That is, the MS cannot know when the handover command message HO_cmd is to be received, such that the time period of the listening window LW2 for receiving the handover command message HO_cmd in the awake mode is set longer than the time period of the listening window LW1 set in the sleep mode of the MS.

However, according to the present disclosure, a pivot BS exists in the handover of the MS, such that a failure probability during the handover is reduced, allowing a design for receiving the handover command message HO_cmd during the listening window LW1 of the sleep mode. Thus, in the handover, the MS does not need to switch to the awake mode from the sleep mode and thus turns on during a listening window of the sleep mode, which is shorter than that of the awake mode, thereby reducing power consumption.

Figure 6:
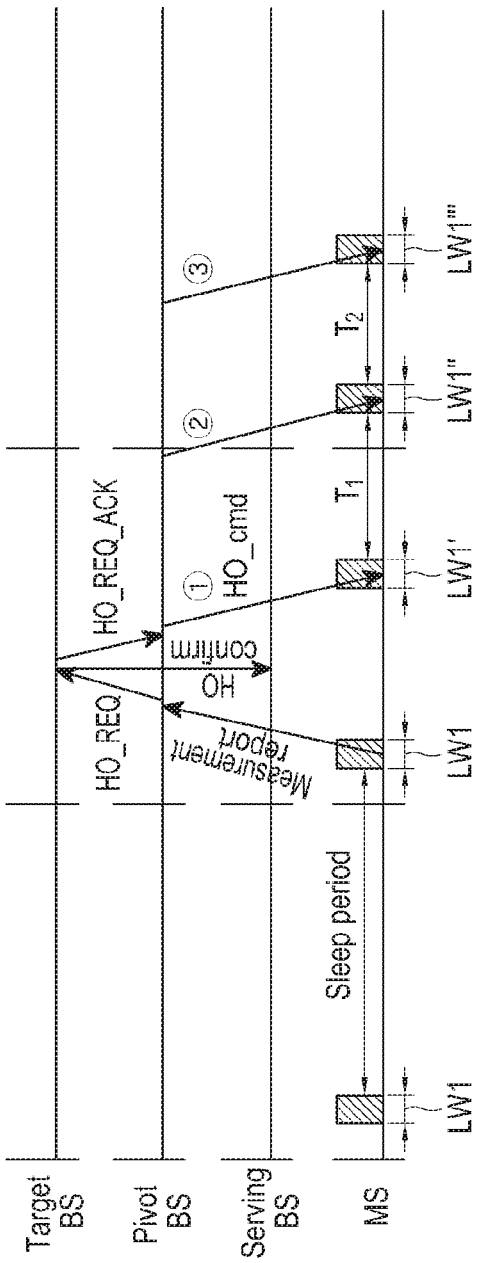
FIG. 6 is a diagram illustrating a handover process according to an embodiment of the present disclosure.
Figure 7:
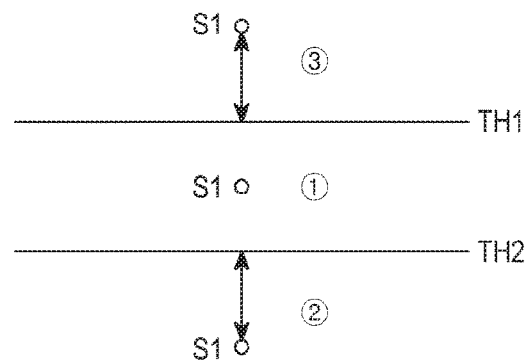
FIG. 7 is a diagram illustrating a method of setting a listening window in a sleep mode after transmission of HO_REQ.

FIG. 6 is a diagram illustrating a handover process according to an embodiment of the present disclosure, and FIG. 7 is a diagram illustrating a method of setting a listening window in a sleep mode after transmission of HO_REQ.

Referring to FIG. 6, a MS measures a channel state of an N-CL if a channel state of a serving BS is lowered to a threshold value or less.

The MS having measured the channel state of the N-CL sends a measurement report message including a measurement result to a pivot BS during the listening window LW1 of the sleep mode. The measurement report message sent to the pivot BS may include information provided below.

(1) Cs: Information about BSs in the S-CL
(2) Ct: Information about BSs in the N-CL (or target cluster)
(3) S1: Channel Quality Information (CQI) of pivot BSs corresponding to the condition "(Cs∩Ct)≠0"

Although not shown in FIG. 6, the MS may obtain Cs and Ct through the CMU (300 of FIG. 1), and the condition means existence of at least one pivot BS and information about existence of the pivot BS may also be obtained by the CMU (300 of FIG. 1).

The pivot BS having received the measurement report message determines a handover of the MS by comparing its channel state with a channel environment of an N-CL based on the received measurement report message.

If determining that the MS needs to perform the handover, the pivot BS sends a handover request message HO_REQ to a target BS in the target cluster. While the MS switches to the awake mode from the sleep mode upon the sending of the handover request message HO_REQ in FIG. 5, the MS maintains the sleep mode without switching to the awake mode in FIG. 6.

If determining to accept the MS, the target BS in the target cluster sends a handover response message HO_REQ_ACK to the pivot BS.

The pivot BS having received the handover response message HO_REQ_ACK sends to the MS, a handover command message HO_cmd indicating start of a handover procedure, together with information necessary for the handover to the target BS.

The MS receives the handover command message HO_cmd from the pivot BS during the listening window LW1 of the sleep mode.

Meanwhile, in an embodiment of the present disclosure, the handover command message HO_cmd is received during the listening window of the sleep mode, which is shorter than that of the awake mode, and therefore, proper setting of the listening window LW1 for improving the reception probability of the handover command message HO_cmd is needed. For example, the listening window LW1 may be set based on comparison between S1 and two reference values, as illustrated in FIG. 7.

More specifically, in case of (1) (TH2<S1<TH1), a listening window LW1' may be set such that the handover command message HO_cmd may be received in a scheduled listening window of the sleep mode.

In case of (2), a listening window LW1" may be set such that the handover command message HO_cmd may be received T1∝(TH2−S1) earlier to improve the reception probability of the handover command message HO_cmd.

In case of (3), a listening window LW1" may be set such that the handover command message HO_cmd may be received T2∝(S1−TH1) later to apply a longer sleep period of the MS.

The information included in the measurement report message may include information necessary for determining transmission and reception times and information about points in time for transmission and reception of the handover command message HO_cmd determined in advance by the MS.

The MS and the BS are intended to transmit and receive the handover command message HO_cmd in the same agreed points in time, such that any information may be included in the measurement report message if the information satisfies such an intention.

Figure 8:
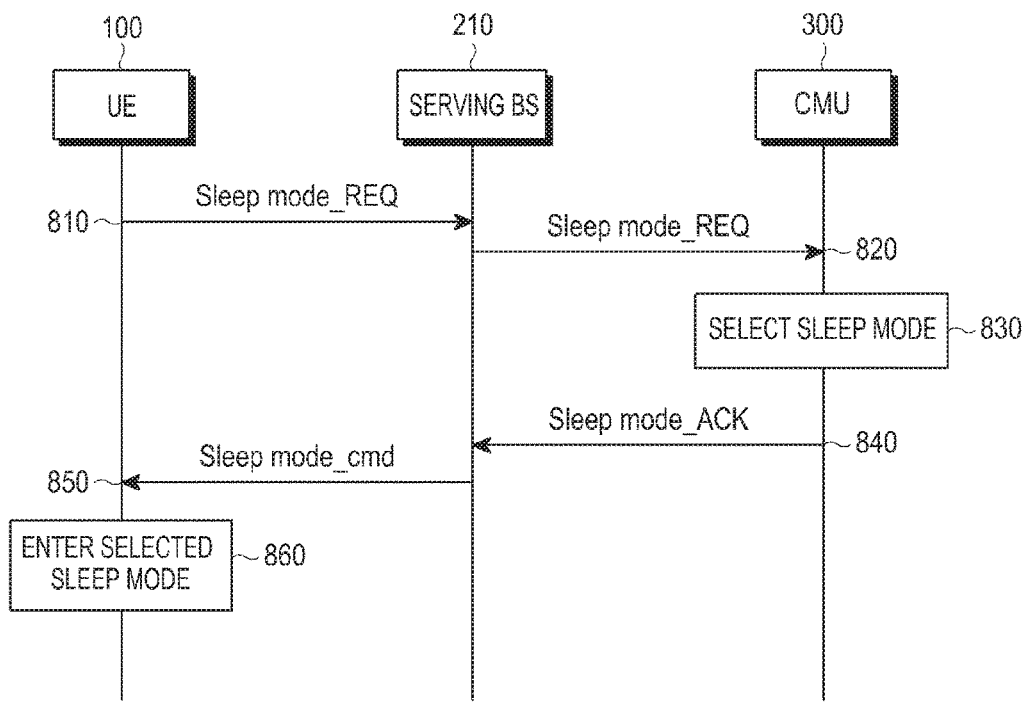
FIG. 8 is a ladder diagram illustrating a signal flow for entry of a UE to a sleep mode according to an embodiment of the present disclosure.

FIG. 8 is a ladder diagram illustrating a signal flow for entry of a UE to a sleep mode according to an embodiment of the present disclosure.

Referring to FIG. 8, at operation 810, a UE 100 sends a sleep mode request message Sleep mode_REQ to a serving BS 210 to request switch to the sleep mode. The sleep mode request message Sleep mode_REQ includes an average UL transmission power of the UE 100 and a DL throughput of the UE 100 in order for the CMU 300 to select a sleep mode type of the UE 100. The sleep mode request message Sleep mode_REQ may further include parameters required for the UE 100 to operate in the sleep mode, for example, message identification information indicating that a currently sent message is the sleep mode request message Sleep mode_REQ, sleep interval information including a start value for a sleep interval and a stop value for the sleep interval, and listening window information indicating a time interval during which the UE 100 wakes up from the sleep mode for a while and receives a forward message of the BS.

At operation 820, the serving BS 210 delivers the sleep mode request message Sleep mode_REQ from the UE 100 to the CMU 300.

At operation 830, the CMU 300 having received the sleep mode request message Sleep mode_REQ selects a serving-BS-based sleep mode or an S-CL-based sleep mode by using the average UL transmission power of the UE 100 and the DL throughput of the UE 100, which are included in the sleep mode request message Sleep mode_REQ. For example, the CMU 300 compares the transmission efficiency E1 calculated using Equation 1 with the transmission efficiency E2 calculated using Equation 2: if E1>E2, the CMU 300 selects the serving-BS-based sleep mode and if E1<E2, the CMU 300 selects the S-CL-based sleep mode. The CMU 300 generates sleep mode indication information indicating the selected sleep mode, and transmits a sleep mode acknowledgement message Sleep mode_ACK to the serving BS 210 through the sleep mode indication information at operation 840.

At operation 850, the serving BS 210 delivers the received sleep mode acknowledgement message Sleep mode_ACK to the UE 100 as a sleep mode command message Sleep mode_cmd. At operation 860, the UE 100 identifies the sleep mode included in the received sleep mode command message Sleepmode_cmd and enters the identified sleep mode.

Figure 9:
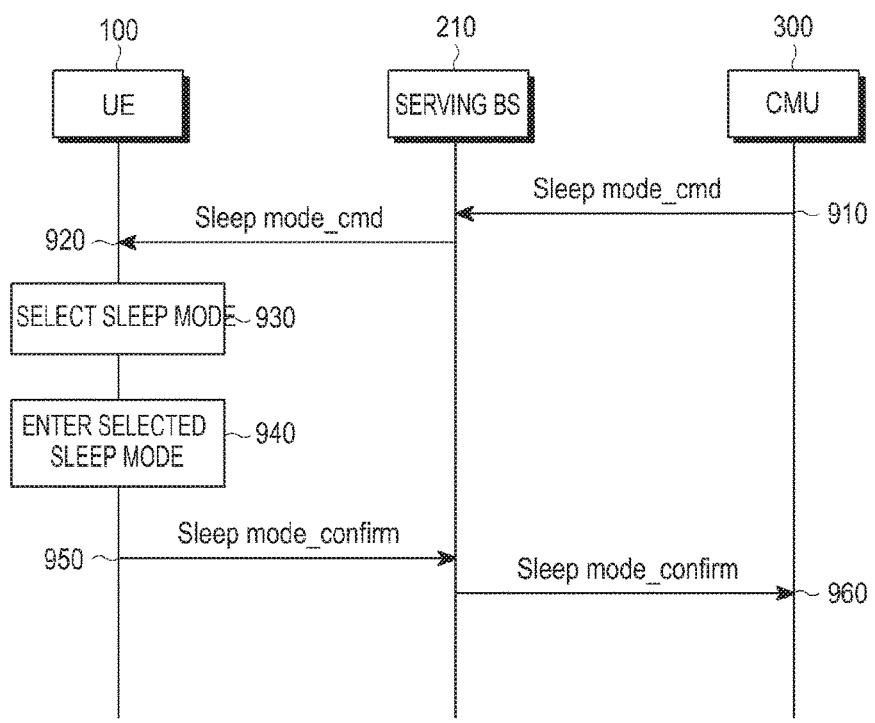
FIG. 9 is a ladder diagram illustrating a signal flow for entry of a UE to a sleep mode according to another embodiment of the present disclosure.

FIG. 9 is a ladder diagram illustrating a signal flow for entry of a UE to a sleep mode according to another embodiment of the present disclosure.

Referring to FIG. 9, in a sleep mode entry process of the UE 100 according to another embodiment of the present disclosure, unlike the embodiment illustrated in FIG. 8, the UE 100 enters the sleep mode under control of the CMU 300, instead of entering the sleep mode at the request of the UE 100, and the UE 100, instead of the CMU 300, selects the sleep mode.

At operation 910, the CMU 300 sends a sleep mode command message to the serving BS 210, and the sleep mode command message Sleep mode_cmd includes parameters required for the UE 100 to operate in the sleep mode, for example, message identification information indicating that a currently sent message is the sleep mode command message Sleep mode_cmd, sleep interval information including a start value for a sleep interval and a stop value for the sleep interval, and listening window information indicating a time interval during which the UE 100 wakes up from the sleep mode for a while and receives a forward message of the BS.

At operation 920, the serving BS 210 sends the received sleep mode command message Sleep mode_cmd to the UE 100, in which the sleep mode command message Sleep mode_cmd includes an UL throughput. As stated before, a DL throughput among variables used for sleep mode selection is obtained by the UE 100, but the UL throughput is obtained by the serving BS 210. Thus, if the UE 100 selects the sleep mode by using the UL throughput, the UL throughput may be obtained from the serving BS 210.

At operation 930, the UE 100 selects a sleep mode by using the UL transmission power and the UL throughput that is included in the sleep mode command message Sleep mode_cmd. A way to select the sleep mode is the same as a way described at operation 830 of FIG. 8.

After entering the sleep mode selected by itself at operation 940, the UE 100 sends sleep mode indication information indicating the selected sleep mode to the serving BS 210 through a sleep mode confirm message Sleep mode_confirm to the serving BS 210 at operation 950. The sleep mode confirm message Sleep mode_confirm may be sent at the same time when the UE 100 enters the selected sleep mode.

At operation 960, the serving BS 210 sends the received sleep mode confirm message Sleep mode_confirm to the CMU 300, thus completing the sleep mode entry process.

Figure 10:
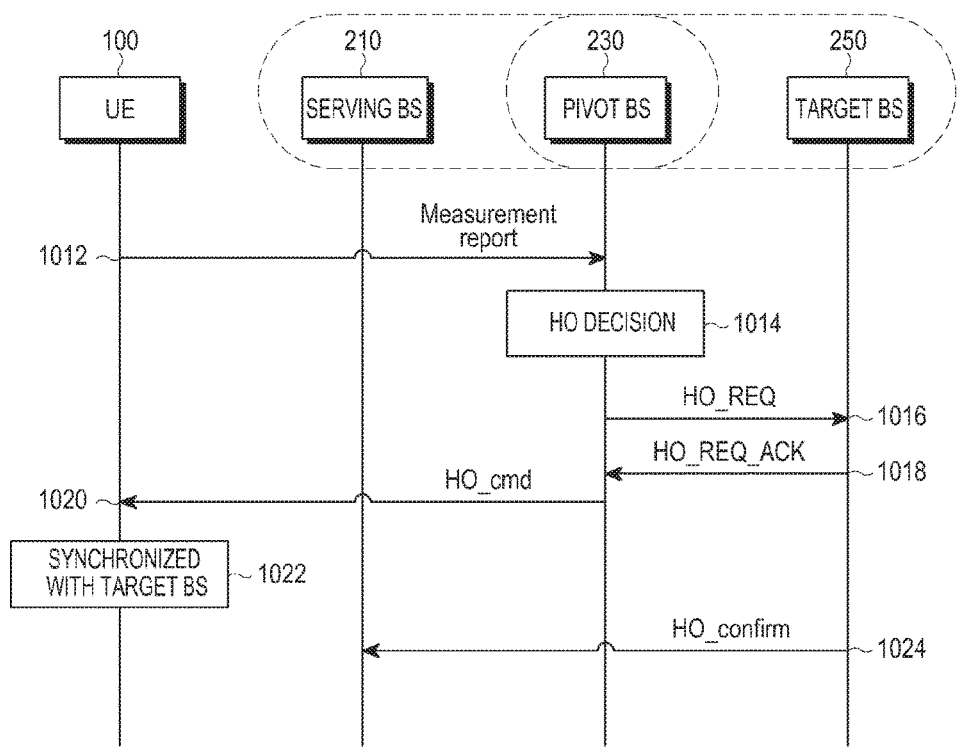
FIG. 10 is a ladder diagram illustrating a signal flow of a handover process of a UE according to an embodiment of the present disclosure.

FIG. 10 is a ladder diagram illustrating a signal flow of a handover process of a UE according to an embodiment of the present disclosure.

Referring to FIG. 10, a handover process of the UE according to an embodiment of the present disclosure assumes that the UE 100 enters the S-CL-based sleep mode at operation 860 of FIG. 8 or at operation 940 of FIG. 9.

At operation 1012, the UE 100 sends a measurement report message to the pivot BS 230. The measurement report message may include information about BSs in the S-CL provided to the UE 100 from a CMU (300 of FIG. 1), information about BSs in the N-CL, and channel quality information (for example, CQI of the pivot BS 230) obtained by measuring a channel state of the pivot BS 230 belonging to both the S-CL and the N-CL. The measurement report message may further include sleep mode identification information for identifying a current sleep mode of the UE 100.

At operation 1014, the pivot BS 230 determines a handover of the UE 100 based on the received measurement report message. For example, if channel states of BSs other than the pivot BS 230 in the N-CL are better than that of the pivot BS 230, the pivot BS 230 selects a BS selected from among the other BSs as the target BS 250 to determine a handover.

At operation 1016, the pivot BS 230 having determined the handover of the UE 100 sends a handover request message HO_REQ to the target BS 250.

At operation 1018, the target BS 250 controls whether to accept the UE 100 for the handover request message HO_REQ, and the target BS 250 having determined to approve the handover of the UE 100 sends a handover response message HO_REQ_ACK to the pivot BS 230.

At operation 1020, the pivot BS 230 having received the handover response message HO_REQ_ACK from the target BS 250 sends a handover command message HO_cmd to the UE 100. The handover command message HO_cmd is intended to indicate that the handover is to be performed to the UE 100. Herein, the UE 100 receives the handover command message HO_cmd while maintaining the S-CL-based sleep mode, without switching to the awake mode to receive the handover command message HO_cmd. That is, since the UE 100 receives the handover command message HO_cmd during the listening window set in the S-CL-based sleep mode, the UE 100 wakes up only during the listening window of the sleep mode that is shorter than that of the awake mode, leading to power consumption reduction.

At operation 1022, the UE 100 having received the handover command message HO_cmd releases connection with the serving BS 210 and performs synchronization with the target BS 250. In this case, connection with the pivot BS 230 is maintained.

At operation 1024, the serving BS 210 releasing connection with the UE 100 receives a handover confirm message HO_Confirm from the target BS 250.

Thereafter, the serving BS 210 having received the handover confirm message HO_Confirm removes data buffered for the UE 100 and removes radio resources allocated to the UE 100.

Figure 11:
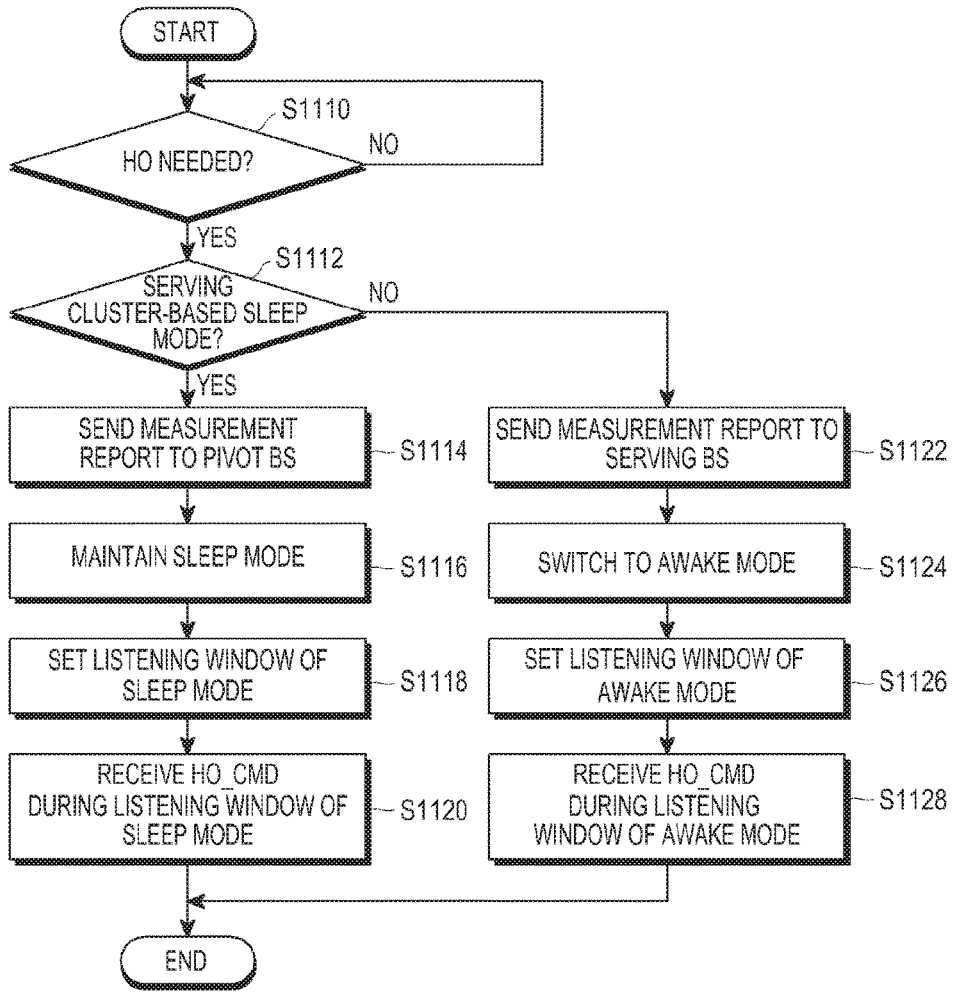
FIG. 11 is a flowchart illustrating a handover process of a UE according to an embodiment of the present disclosure.

FIG. 11 is a flowchart illustrating a handover process of a UE according to an embodiment of the present disclosure.

Referring to FIG. 11, at operation S1110, after completing scanning of CINRs of pilot signals received from neighboring BSs in the N-CL, the UE determines whether to change a serving BS to which the UE currently belongs. That is, the UE determines whether to perform a handover to a new BS that is different from the current serving BS. Herein, scanning of the CINRs performed by the UE may be omitted for a pivot BS in the N-CL, that is, the pivot BS belonging to both the S-CL and the N-CL.

At operation S1112, if determining to perform the handover, the UE determines whether its current sleep mode is the S-CL-based sleep mode.

At operation S1114, if determining that the current sleep mode is the S-CL-based sleep mode, the UE sends a measurement report message to the pivot BS belonging to both the S-CL and the N-CL. Herein, the measurement report message may include information about BSs in the S-CL, information about BSs in the N-CL, and CQI of the pivot BS. The measurement report message may further include sleep mode identification information indicating whether the UE is in the serving-cell-based sleep mode or the S-CL-based sleep mode.

The pivot BS sends a handover request message HO_REQ to a target BS in the N-CL (or a target cluster) based on the received measurement report message.

At operation S1116, after sending the measurement report message, the UE maintains the sleep mode without switching to the awake mode, because the current sleep mode of the UE is the S-CL-based sleep mode. Herein, the UE maintains the sleep mode even after the pivot BS transmits the handover request message HO_REQ to the target BS, such that the present disclosure is clearly different from conventional techniques.

At operation S1118, to accurately receive a handover command message HO_cmd corresponding to a handover response message HO_REQ_ACK sent from the target BS in response to the handover request message HO_REQ, the UE properly sets a reception time of the handover command message HO_cmd based on a result of comparison between the CQI of the pivot BS with a particular threshold value, as described with reference to FIG. 7. That is, as shown in FIG. 6, the UE may set the reception time of the handover command message HO_cmd by delaying or advancing a listening window of the sleep mode on a time axis based on the comparison result.

At operation S1120, the UE receives the handover command message HO_cmd in the set listening window.

If the current sleep mode is not the S-CL-based sleep mode at operation S1112, the UE sends a measurement report message to the serving BS instead of the pivot BS at operation S1122.

After sending the measurement report message, the UE switches to the awake mode at operation S1124, and sets a scheduled listening window in the awake mode to receive the handover command message HO_cmd from the serving BS at operation S1126.

At operation S1128, the UE receives the handover command message HO_cmd in the scheduled listening mode of the awake mode, thus completing a process of receiving a handover instruction from the target BS during the entire handover process.

Figure 12:
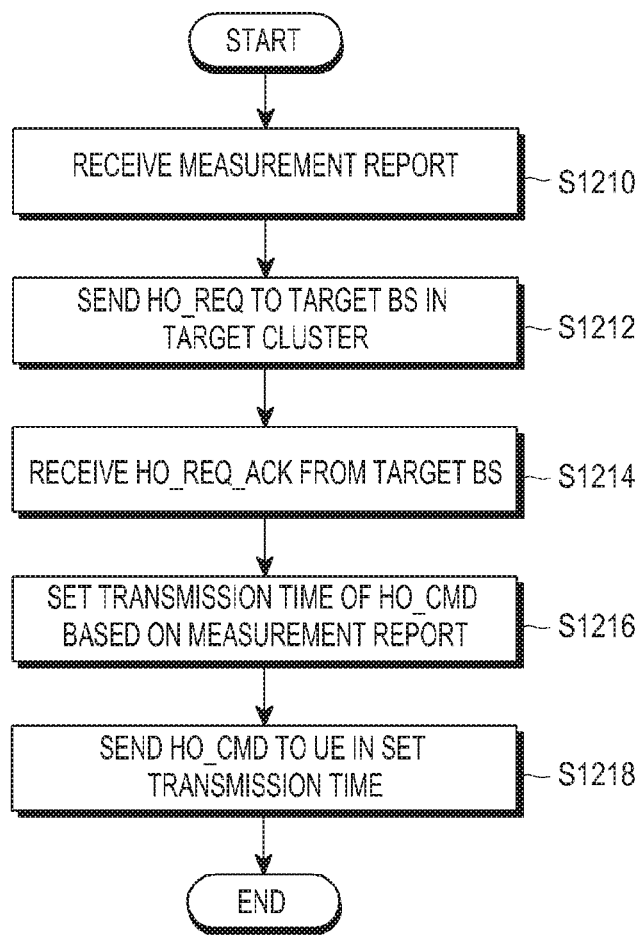
FIG. 12 is a flowchart illustrating a handover process of a pivot BS according to an embodiment of the present disclosure.

FIG. 12 is a flowchart illustrating a process of performing a handover in a pivot BS according to an embodiment of the present disclosure.

Referring to FIG. 12, at operation S1210, the pivot BS receives a measurement report message including information about BSs in the S-CL, information about BSs in the N-CL, and CQI of the pivot base station, and sleep mode identification information of the UE from the UE. Herein, the pivot BS may obtain the current sleep mode identification information of the UE through the CMU, and in this case, the measurement report message may not include the sleep mode identification information of the UE.

At operation S1212, the pivot BS determines a handover based on the measurement report message and then sends a handover request message HO_REQ to a target BS in the N-CL (target cluster).

At operation S1214, the pivot BS receives a handover response message HO_REQ_ACK from the target BS, and at operation S1216, the pivot BS sets a transmission time of a handover command message HO_cmd based on the CQI of the pivot BS included in the measurement report message received at operation S1210. That is, the pivot BS sets the transmission time of the handover command message HO_cmd such that the UE may receive the handover command message HO_cmd during a listening window of the UE maintaining the sleep mode. The process of setting the transmission time of the handover command message HO_cmd has already been described with reference to FIGS. 6 and 7, and thus will not be described in detail.

At operation S1218, the pivot BS sends the handover command message HO_cmd to the UE at the set transmission time, thus completing a process of instructing the UE to perform a handover during the entire handover process.

As such, in the present disclosure, based on a transmission efficiency corresponding to an UL transmission power-to-throughput $$\left(\frac{UL \text{ transmission power of } UE}{\text{Throughput of } UE}\right),$$

it is determined whether to select a single serving BS to enter a sleep mode (the serving-BS-based sleep mode) or to select an S-CL including multiple BSs that cooperatively communicate with one another to enter the sleep mode (the S-CL-based sleep mode), thereby improving the power efficiency of the UE.

Moreover, when the UE performs a handover in the S-CL-based sleep mode, instead of switching to the awake mode to generate a new scheduled listening window in the awake mode to receive the handover command message HO_cmd, the UE maintains the sleep mode by using the pivot BS and receives the handover command message HO_cmd merely by adjusting a sleep cycle based on the channel state, contributing to power saving of the UE.

Figure 13:
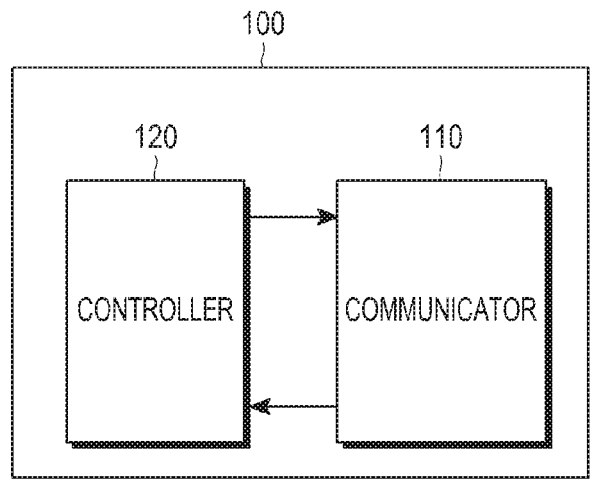
FIG. 13 is a block diagram of a UE according to an embodiment of the present disclosure.

FIG. 13 is a block diagram of a UE according to an embodiment of the present disclosure.

Referring to FIG. 13, the UE according to an embodiment of the present disclosure may include a communicator 101 and a controller 102.

The communicator 101 may perform wireless communication with BSs in the S-CL and BSs in the N-CL, and may be, for example, an RF transceiver. The communicator 101 may switch to the sleep mode under control of the controller 102, and upon switching to the sleep mode, the communicator 110 is turned on for a while to receive a forward message of the BS.

The controller 102 controls the overall operation of the UE 100, and controls the communicator 101 to switch to the sleep mode. The controller 120 switches the communicator 101 to the sleep mode in an environment of communication with the S-CL including multiple BSs, taking an UL transmission power of the UE into account. If the communicator 101 enters the sleep mode, the controller 102 controls the communicator 101 to send a measurement report message to a pivot BS belonging to both the S-CL and the N-CL. The controller 102 controls the communicator 101 to receive a handover command message from the pivot BS during a listening window of the sleep mode, based on the measurement report message.

The controller 102 determines whether to enter the sleep mode, taking an efficiency corresponding to the UL transmission power-to-DL/UL throughput into account.

The controller 102 reports a sleep mode request message including the UL power and the DL throughput of the UE to the CMU through the serving BS of the S-CL, and if the CMU determines entry to the sleep mode based on an efficiency corresponding to a UL transmission power-to-DL throughput of the UE, then the controller 102 controls the communicator 101 to receive the sleep mode command indicating the determination result through the serving BS.

The controller 102 also receives a sleep mode command including the UL throughput from the serving BS in the S-CL under control of the CMU, and if determining to enter the sleep mode based on an efficiency corresponding to a UL transmission power-to-UL throughput of the UE, then the controller 102 controls the communicator 101 to send the determination result to the CMU as a sleep mode confirm message through the serving BS.

The controller 102 compares the CQI with a threshold value, adjusts a sleep cycle defined as a cycle between a previous listening window and a current listening window based on the comparison result, sets the listening window according to the adjusted sleep cycle, and controls the communicator 110 to receive the handover command message in the set listening window.

Figure 14:
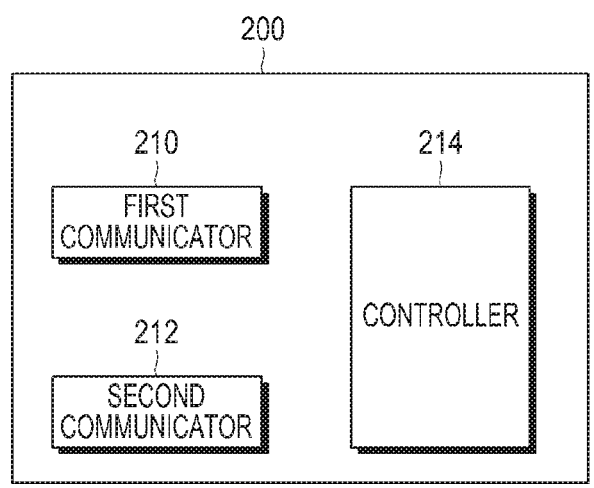
FIG. 14 is a block diagram of a BS according to an embodiment of the present disclosure.

FIG. 14 is a block diagram of a BS according to an embodiment of the present disclosure.

Referring to FIG. 14, a BS 200 may include a first communicator 201, a second communicator 202, and a controller 203.

The first communicator 201 performs wireless communication with the UE, and the second communicator 202 performs wireless communication with neighboring BSs, and they may be implemented in one unit according to a design although being separated in FIG. 14, as is obvious to those of ordinary skill in the art.

The controller 203 receives a measurement report message including sleep mode identification information from the UE that communicates with a serving BS among multiple BSs of an S-CL through the first communicator 201.

The controller 203 controls the second communicator 202 to send a handover request message corresponding to the received measurement report message to a target BS in an N-CL that is adjacent to the S-CL, and to receive a handover response message corresponding to the handover request message from the target BS.

The controller 203 sets a transmission time of the handover command message such that the handover command message corresponding to the handover response message may be received during the listening window of the sleep mode set in the UE, if determining from the sleep mode identification information of the UE that the UE is in the sleep mode based on the communication environment with the S-CL.

As is apparent from the foregoing description, by selecting a single serving BS or S-CL based on a transmission power/throughput efficiency of the UE, power saving of the UE may be improved. Moreover, power saving of the UE may be maximized merely by adjusting a sleep cycle based on a channel state, while maintaining the sleep mode of the UE.

Other effects that may be obtained or expected from the embodiments of the present disclosure are explicitly or implicitly disclosed in the detailed description of the embodiment of the present disclosure. For example, various effects expected from the embodiments of the present disclosure have been disclosed in the detailed description of the present disclosure.

While the present disclosure has been particularly shown and described with reference to exemplary embodiments thereof, various changes in form and detail may be made therein without departing from the spirit and scope of the present disclosure as defined by the following claims. Accordingly, the scope of the present disclosure will be defined by the appended claims and equivalents thereto.

The invention claimed is:

1. A method for performing a handover in a user equipment (UE) of a mobile communication system with a serving cluster comprising multiple base stations (BSs) and a neighboring cluster that is adjacent to the serving cluster, the method comprising:
   determining whether to enter a sleep mode based on an uplink (UL) transmission power of the UE;
   sending a measurement report message to a pivot BS belonging to both the serving cluster and the neighboring cluster, if entering the sleep mode; and
   receiving a handover command message from the pivot BS during a listening window of the sleep mode, based on the measurement report message.

2. The method of claim 1, wherein the determining of whether to enter the sleep mode comprises:
   determining whether to enter the sleep mode based on an efficiency corresponding to a UL transmission power-to-downlink (DL) or UP throughput.

3. The method of claim 2, wherein the determining of whether to enter the sleep mode comprises:
   reporting a sleep mode request message comprising the UL transmission power and the DL throughput of the UE to a Central Management Unit (CMU) through a serving BS in the serving cluster; and
   receiving a sleep mode command message through the serving BS if determining, by the CMU, that the UE is to enter the sleep mode based on the efficiency corresponding to the UL transmission power-to-DL throughput of the UE.

4. The method of claim 2, wherein the determination of whether to enter the sleep mode comprises:
   receiving a sleep mode command message comprising the UL throughput from the serving BS in the serving cluster based on an instruction of the CMU;
   determining whether to enter the sleep mode based on the efficiency corresponding to the UL transmission power-to-UL throughput of the UE; and
   sending a result of the determination to the CMU through the serving BS as a sleep mode confirm message, if determining to enter the sleep mode.

5. The method of claim 1, wherein the measurement report message comprises at least one of information about BSs in the serving cluster, information about BSs in the neighboring cluster, a channel quality value of the pivot BS, and sleep mode identification information of the UE.

6. The method of claim 5, wherein the receiving of the handover command message comprises:
   comparing the channel quality value with a threshold value;
   adjusting a sleep cycle defined as a cycle between a previous listening window and a current listening window, based on a result of the comparison;
   setting the listening window according to the adjusted sleep cycle; and
   receiving the handover command message in the set listening window.

7. A method for performing a handover in a base station (BS) of a mobile communication system with a serving cluster comprising multiple base stations (BSs) and a neighboring cluster that is adjacent to the serving cluster, the method comprising:
   receiving a measurement report message comprising sleep mode identification information from a user equipment (UE) that communicates with a serving BS among the multiple BSs of the serving cluster and has entered a sleep mode;
   sending a handover request message for the received measurement report message to a target BS in the neighboring cluster; receiving a handover response message with respect to the handover request message from the target BS and determining based on the sleep mode identification information of the UE whether the sleep mode is based on communication with the serving cluster; and setting a transmission time of a handover command message with respect to the handover response message to allow the handover command message to be received during a listening window of the sleep mode set by the UE if the sleep mode is based on communication with the serving cluster.

8. The method of claim 7, wherein the measurement report message further comprises at least one of information about BSs in the serving cluster, information about BSs in the neighboring cluster, and a channel quality value of a pivot BS belonging to both the serving cluster and the neighboring cluster.

9. The method of claim 8, wherein the transmission time of the handover command message is set according to the channel quality value of the pivot BS.

10. The method of claim 8, wherein the transmission time of the handover command message comprises:
    comparing the channel quality value with a threshold value;
    identifying a sleep cycle of the UE defined as a cycle between a previous listening window and a current listening window; and
    sending the handover command message during the listening window of the UE according to the sleep cycle of the UE.

11. A user equipment (UE) that performs a handover in a mobile communication system with a serving cluster comprising multiple base stations (BSs) and a neighboring cluster that is adjacent to the serving cluster, the UE comprising:
    a communicator configured to switch to a sleep mode; and
    a controller configured to switch the communicator to a sleep mode based on an uplink (UL) transmission power of the UE, and to control the communicator to send a measurement report message to a pivot BS belonging to both the serving cluster and the neighboring cluster and to receive a handover command message from the pivot BS during a listening window of the sleep mode based on the measurement report message, if the communicator enters the sleep mode.

12. The UE of claim 11, wherein the controller is further configured to determine whether to enter the sleep mode based on an efficiency corresponding to a UL transmission power-to-downlink (DL) or UP throughput.

13. The UE of claim 12, wherein the controller is further configured to report a sleep mode request message comprising the UL transmission power and the DL throughput of the UE to a central management unit (CMU) through a serving BS in the serving cluster, and control to the communicator to receive a sleep mode command message through the serving BS if the CMU determines that the UE is to enter the sleep mode, based on the efficiency corresponding to the UL transmission power-to-DL throughput of the UE.

14. The UE of claim 12, wherein the controller is further configured to receive a sleep mode command message comprising the UL throughput from the serving BS in the serving cluster based on an instruction of the CMU, and control the communicator to send a result of the determination to the CMU through the serving BS as a sleep mode confirm message, if determining to enter the sleep mode based on the efficiency corresponding to the UL transmission power-to-UL throughput of the UE.

15. The UE of claim 11, wherein the measurement report message comprises at least one of information about BSs in the serving cluster, information about BSs in the neighboring cluster, a channel quality value of the pivot BS, and sleep mode identification information of the UE.

16. The UE of claim 15, wherein the controller is further configured to compare the channel quality value with a threshold value, adjust a sleep cycle defined as a cycle between a previous listening window and a current listening window, based on a result of the comparison, and set the listening window according to the adjusted sleep cycle to control the communicator to receive the handover command message in the set listening window.

17. A base station (BS) that performs a handover in a mobile communication system with a serving cluster comprising multiple base stations (BSs) and a neighboring cluster that is adjacent to the serving cluster, the BS comprising:
   a communicator configured to receive a measurement report message comprising sleep mode identification information from a user equipment (UE) that communicates with a serving BS among the multiple BSs of the serving cluster and has entered a sleep mode; and
   a controller configured to send a handover request message for the received measurement report message to a target BS in the neighboring cluster and to receive a handover response message with respect to the handover request message from the target BS and determine based on the sleep mode identification information of the UE whether the sleep mode is based on communication with the serving cluster, and to set a transmission time of a handover command message with respect to the handover response message to allow the handover command message to be received during a listening window of the sleep mode set by the UE if the sleep mode is based on communication with the serving cluster.

18. The BS of claim 17, wherein the measurement report message further comprises at least one of information about BSs in the serving cluster, information about BSs in the neighboring cluster, and a channel quality value of a pivot BS belonging to both the serving cluster and the neighboring cluster.

19. The BS of claim 18, wherein the controller is further configured to set the transmission time of the handover command message according to the channel quality value of the pivot BS.

20. The BS of claim 18, wherein the controller is further configured to compare the channel quality value with a threshold value, identify a sleep cycle of the UE defined as a cycle between a previous listening window and a current listening window, and set the transmission time of the handover command message to send the handover command message during the listening window of the UE according to the sleep cycle of the UE.

* * * * *